(12) United States Patent
Ogawa et al.

(10) Patent No.: US 9,771,106 B2
(45) Date of Patent: Sep. 26, 2017

(54) VEHICLE BODY FRONT STRUCTURE

(71) Applicant: TOYOTA JIDOSHA KABUSHIKI KAISHA, Toyota-shi (JP)

(72) Inventors: Koji Ogawa, Toyota (JP); Yuichi Tsunoda, Nukata-gun (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/909,694

(22) PCT Filed: Aug. 7, 2014

(86) PCT No.: PCT/IB2014/001483
§ 371 (c)(1),
(2) Date: Feb. 2, 2016

(87) PCT Pub. No.: WO2015/019167
PCT Pub. Date: Feb. 12, 2015

(65) Prior Publication Data
US 2016/0167712 A1  Jun. 16, 2016

(30) Foreign Application Priority Data

Aug. 9, 2013 (JP) .................................. 2013-166503
Aug. 9, 2013 (JP) .................................. 2013-166505

(51) Int. Cl.
*B60R 19/34* (2006.01)
*B62D 21/15* (2006.01)
(Continued)

(52) U.S. Cl.
CPC ............ *B62D 21/152* (2013.01); *B60R 19/24* (2013.01); *B62D 25/08* (2013.01); *B62D 25/082* (2013.01); *B60R 2019/247* (2013.01)

(58) Field of Classification Search
CPC .... B62D 21/152; B62D 25/08; B62D 25/082; B60R 19/24; B60R 2019/247
See application file for complete search history.

(56) References Cited

U.S. PATENT DOCUMENTS

2004/0195862 A1   10/2004  Saeki
2013/0320710 A1*  12/2013  Watanabe ............ B62D 25/082
                                               296/187.09
(Continued)

FOREIGN PATENT DOCUMENTS

JP    58-170249 U    11/1983
JP    62-123463 U    8/1987
(Continued)

OTHER PUBLICATIONS

Partial English translation of Japanese Office Action issued in JP2013-166505 dated Aug. 9, 2013 (3 pages).
(Continued)

*Primary Examiner* — Lori L Lyjak
(74) *Attorney, Agent, or Firm* — Oblon, McClelland, Maier & Neustadt, L.L.P.

(57) ABSTRACT

A vehicle body front structure includes a front side member, a crush box, a bumper reinforcement, a spacer and a stepped portion. The spacer has an engaging portion and protrudes rearward in a longitudinal direction of a vehicle from an extending portion formed outside in a width direction of the vehicle relative to a connected portion of the bumper reinforcement, the connected portion being connected to the crush box. The stepped portion is formed on a part of a side wall portion of the front side member. The stepped portion is provided behind the engaging portion in the longitudinal direction of the vehicle apart from the engaging portion. The stepped portion is configured to engage with the engaging portion when the crush box is deformed in the longitudinal direction of the vehicle.

12 Claims, 12 Drawing Sheets

(51) Int. Cl.
*B62D 25/08* (2006.01)
*B60R 19/24* (2006.01)

(56) References Cited

U.S. PATENT DOCUMENTS

2015/0115653 A1    4/2015   Ookubo et al.
2015/0298634 A1   10/2015   Hara et al.

FOREIGN PATENT DOCUMENTS

| | | |
|---|---|---|
| JP | 2008-213739 A | 9/2008 |
| JP | 2012-228907 A | 11/2012 |
| JP | 2015-33961 A | 2/2015 |
| WO | 2013/172132 A1 | 11/2013 |
| WO | 2014/088045 A1 | 6/2014 |
| WO | 2014/088117 A1 | 6/2014 |
| WO | 2014/112596 A1 | 7/2014 |

OTHER PUBLICATIONS

International Search Report Dec. 2, 2014 in PCT/IB14/01483 dated Aug. 7, 2014.
IPRP Oct. 19, 2015 in PCT/IB14/01483 dated Aug. 7, 2014.

\* cited by examiner

VEHICLE BODY FRONT STRUCTURE

BACKGROUND OF THE INVENTION

1. Field of the Invention

The present invention relates to a vehicle body front structure.

2. Description of Related Art

There has been a vehicle body front structure including a front side member, a crush box provided on the front side of the front side member in the longitudinal direction of the vehicle and a bumper reinforcement fixed to a front end portion of the front side member via the crush box.

Moreover, in this kind of vehicle body front structures, there is one including a first protruding portion that extends outward in the width direction of the vehicle from a lateral side of the front side member and a second protruding portion that protrudes to the back side of the vehicle from an extending portion formed outside in the width direction of the vehicle relative to a portion connected to the crush box in the bumper reinforcement (see, for example, Japanese Patent Publication No. 2012-228907 (JP 2012-228907 A)).

In the vehicle body front structure described in JP 2012-228907 A, for example, when a collision load acts on the extending portion from the front side of the vehicle in the event of short overlap collision, the second protruding portion moves to the back side of the vehicle in accordance with compressive deformation of the crush box, and this second protruding portion interferes with the first protruding portion.

However, in the vehicle body front structure described in JP 2012-228907 A, two members of the first protruding portion and the second protruding portion are used to transmit the collision load. Due to this, the weight of a vehicle body front increases.

Moreover, in the vehicle body front structure described in JP 2012-228907 A, the first protruding portion and the second protruding portion are provided on the lateral side of the crush box and the front side member. Accordingly, a space is needed on the lateral side of the crush box and the front side member. Further, since two members of the first protruding portion and the second protruding portion are used, the weight of the vehicle body front part increases.

SUMMARY OF THE INVENTION

The present invention provides a vehicle body front structure that achieves weight saving of a vehicle body front part. Moreover, the present invention provides the vehicle body front structure that achieves space saving on the lateral side of the crush box and the front side member as well as weight saving of the vehicle body front part.

A vehicle body front structure according to a first aspect of the present invention includes a front side member, a crush box, a bumper reinforcement, a spacer, and a stepped portion. The front side member extends in a longitudinal direction of a vehicle. The crush box is provided on a front side of the front side member in the longitudinal direction of the vehicle and has lower compression strength than compression strength of the front side member in the longitudinal direction of the vehicle. The bumper reinforcement extends in a width direction of the vehicle and is fixed to a front end portion of the front side member via the crush box. The spacer has an engaging portion and protrudes rearward in the longitudinal direction of the vehicle from an extending portion formed outside in the width direction of the vehicle relative to a connected portion of the bumper reinforcement, the connected portion being connected to the crush box. The stepped portion is formed on a part of a side wall portion of the front side member, that is provided behind the engaging portion in the longitudinal direction of the vehicle to be apart from the engaging portion, and that is configured to engage with the engaging portion when the crush box is deformed in the longitudinal direction of the vehicle.

According to the above vehicle body front structure, structures for transmitting a collision load from the spacer to the front side member are the engaging portion formed on the spacer and the stepped portion formed on a part of the side wall portion forming the front side member. Consequently, compared to the structure having the first protruding portion protruding to the back side of the vehicle from the extending portion and the second protruding portion protruding outward in the width direction of the vehicle from the front side member as in the related art, a simple structure can be achieved, which achieves weight saving of the vehicle body front part.

In the first aspect of the present invention, the recess may be recessed inward in the width direction of the vehicle is formed on the side wall portion. The stepped portion may be formed by a wall portion of a back side of the recess in the longitudinal direction of the vehicle. The pair of guide portions may be formed on the recess, the guide portions extending forward in the longitudinal direction of the vehicle from both end portions of the stepped portion in a vertical direction of the vehicle.

According to the above vehicle body front structure, a pair of guide portions extending to the front side of the vehicle from both ends in the vertical direction of the vehicle of the stepped portion is formed on a side wall portion of the front side member outside in the width direction of the vehicle. Accordingly, the engaging portion can be guided by the pair of guide portions so that the engaging portion can be smoothly engaged with the stepped portion. Moreover, by forming a recess that is recessed inward in the width direction of the vehicle on the side wall portion, the stepped portion and the pair of guide portions can be formed on the side wall portion, and thus the stepped portion and the pair of guide portions can be easily formed.

In the first aspect of the present invention, a distance between the engaging portion and the stepped portion along the longitudinal direction of the vehicle may be a compression stroke of the crush box or more.

In this vehicle body front structure, for example, the collision load acts on the extending portion from the front side of the vehicle body in the event of short overlap collision, the crush box is subjected to the compressive deformation. Here, the distance between the engaging portion formed on the spacer and the stepped portion formed on the front side member along the longitudinal direction of the vehicle is a compression stroke of the crush box or more. Consequently, in the event of the compressive deformation of the crush box, the movement of the spacer toward the back side of the vehicle relative to the front side member is allowed. Accordingly, in an initial stage of collision, collision energy can be absorbed by the compressive deformation of the crush box.

Moreover, when the collision is progressed and the crush box is subjected to the compressive deformation, the engaging portion formed on the spacer is engaged with the stepped portion formed on the front side member. Also, since the engaging portion is thus engaged with the stepped portion, the movement of the spacer toward the back side of the vehicle relative to the front side member is inhibited, and the collision load is transmitted from the spacer to the front side member via the engaging portion and the stepped portion. Consequently, at the state where the collision is progressed, an axial load (reaction force) can be increased by the front side member.

In the first aspect of the present invention, a distance between the engaging portion and the stepped portion along the longitudinal direction of the vehicle may be a compression stroke of the crush box or more.

According to the above vehicle body front structure, the distance between the engaging portion and the stepped portion along the longitudinal direction of the vehicle is equal to the compression stroke of the crush box. Accordingly, during the compressive deformation of the crush box, the engaging portion is maintained to be apart from the stepped portion. Consequently, limitation of the movement of the spacer, before the crush box is subjected to the compressive deformation, toward the back side of the vehicle relative to the front side member can be inhibited. Therefore, in an initial stage of collision, the collision energy can be absorbed by the crush box more efficiently.

In addition, after the compressive deformation of the crush box, the engaging portion is engaged with the stepped portion, so that the movement of the spacer toward the back side of the vehicle relative to the front side member is inhibited. Consequently, while an axial load is exerted by the front side member immediately after the compressive deformation of the crush box, the collision energy can be absorbed by the front side member more efficiently.

In the first aspect of the present invention, the stepped portion may be formed on the side wall portion. Furthermore, a reinforcement patch may be attached on an inner face of the side wall portion in the width direction of the vehicle to overlap with the stepped portion.

According to the above vehicle body front structure, on an inner face of the side wall portion in the width direction of the vehicle, a reinforcement patch is attached to overlap with the stepped portion. Consequently, rigidity of a peripheral portion of the stepped portion can be improved by this reinforcement patch. Therefore, in a state that the engaging portion is engaged with the stepped portion, the collision load can be transmitted from the spacer to the front side member more efficiently.

In the first aspect of the present invention, the front side member may include a front side member inner and a front side member outer. The front side member inner has a hat-shaped cross-section opened outward in the width direction of the vehicle. The front side member outer is placed outside relative to the front side member inner in the width direction of the vehicle. An upper end portion of the reinforcement patch may be coupled to upper end portions of the front side member inner and the front side member outer. A lower end portion of the reinforcement patch may be coupled to lower end portions of the front side member inner and the front side member outer.

According to the above vehicle body front structure, the upper end portion of the reinforcement patch is coupled to the upper end portions of the front side member inner and the front side member outer. Furthermore, the lower end portion of the reinforcement patch is coupled to the lower end portions of the front side member inner and the front side member outer. Accordingly, in the state that the engaging portion is engaged with the stepped portion, the collision load transmitting in the spacer can be transmitted to an edge line of the front side member inner via the upper end portion and the lower end portion of the reinforcement patch. Because of this, the axial load (reaction force) by the front side member can be further increased.

As explained in detail above, according to the first aspect of the present invention, weight saving of the vehicle body front part can be achieved.

A vehicle body front structure according to a second aspect of the present invention includes a front side member, a crush box, a bumper reinforcement, a spacer, and a pin portion. The front side member extends in a longitudinal direction of a vehicle. The crush box is provided on a front side of the front side member in the longitudinal direction of the vehicle and has lower compression strength than compression strength of the front side member in the longitudinal direction of the vehicle. The bumper reinforcement extends in a width direction of the vehicle and is fixed to a front end portion of the front side member via the crush box. The spacer protrudes rearward in the longitudinal direction of the vehicle from an extending portion formed outside in the width direction of the vehicle relative to a connected portion of the bumper reinforcement, the connected portion being connected to the crush box. The pin portion is configured to inhibit the spacer from moving rearward relative to the front side member in the longitudinal direction of the vehicle. The slit that extends in the longitudinal direction of the vehicle is formed on at least one of the front side member and the spacer. The pin portion is inserted into the slit. The pin portion is configured to move in the slit in accordance with compressive deformation of the crush box when a collision load acts on the extending portion from a front side of the vehicle. The pin portion is engaged with an end portion of the slit after the compressive deformation of the crush box.

According to the above vehicle body front structure, when the collision load acts on the extending portion from the front side of the vehicle in the event of short overlap collision, the crush box is subjected to the compressive deformation. Moreover, in this case, the pin portion relatively moves in the slit in accordance with the compressive deformation of the crush box and the movement of the spacer toward the back side of the vehicle relative to the front side member is allowed. Accordingly, in an initial stage of collision, the collision energy can be absorbed by the compressive deformation of the crush box.

On the other hand, after the compressive deformation of the crush box with the progress of the collision, the pin portion is engaged with an end portion of the slit, so that the movement of the spacer rearward in the longitudinal direction of the vehicle relative to the front side member is inhibited. Moreover, via the pin portion and the end portion of the slit, the collision load is transmitted from the spacer to the front side member. Accordingly, at the stage that the collision is progressed, an axial load (reaction force) can be increased by the front side member.

Here, structures for transmitting the collision load from the spacer to the front side member described above are the slit formed on at least one of the front side member and the spacer and the pin portion inserted into the slit. Consequently, compared to the structure having the first protruding portion protruding to the back side of the vehicle from the extending portion and the second protruding portion protruding outward in the width direction of the vehicle from the front side member as in the related art, a simple structure can be achieved, which achieves space saving on the lateral side of the crush box and the front side member and weight saving of the vehicle body front part.

In the second aspect of the present invention, the pin portion may be configured to move in the slit during the compressive deformation of the crush box, and after the compressive deformation of the crush box, the pin portion may be engaged with the end portion of the slit to inhibit the spacer from moving rearward relative to the front side member.

According to the above vehicle body front structure, the pin portion relatively moves with respect to the slit during the compressive deformation of the crush box. Accordingly, limitation of the movement of the spacer, before the compressive deformation of the crush box, toward the back side of the vehicle relative to the front side member can be inhibited. Thus, in an initial stage of the collision, the collision energy can be absorbed efficiently by the crush box.

Moreover, after the compressive deformation of the crush box, the pin portion is engaged with an end portion of the slit, so that the movement of the spacer toward the back side of the vehicle relative to the front side member is inhibited. Accordingly, while the axial load is exerted by the front side member immediately after the compressive deformation of the crush box, the collision energy can be efficiently absorbed by the front side member.

In the second aspect of the present invention, the slit may be formed on one of the front side member and the spacer.

According to the above vehicle body front structure, since the slit is formed on one of the front side member and the spacer, the structure of the other of the front side member and the spacer can be simplified.

In the second aspect of the present invention, the slit may include a first slit formed on the front side member and a second slit formed on the spacer.

According to the above vehicle body front structure, the slit has a first slit formed in the front side member and a second slit formed in the spacer. Accordingly, compared to the case where the slit is formed in one of the front side member and the spacer, the length of the slit formed in the front side member and the spacer can be shortened. This ensures rigidity of the front side member and the spacer.

As described in detail above, according to the second aspect of the present invention, space saving on the lateral side of the crush box and the front side member as well as weight saving of the vehicle body front part can be achieved.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, a first embodiment according to the present invention will be explained with reference to the drawings.

Incidentally, an arrow UP, an arrow FR and an arrow OUT shown in each drawing that will be explained hereinafter respectively show an upper direction in a vertical direction of a vehicle, a front direction in a longitudinal direction of the vehicle and an outer direction in a width direction of the vehicle (left side of the vehicle body).

Figure 1:
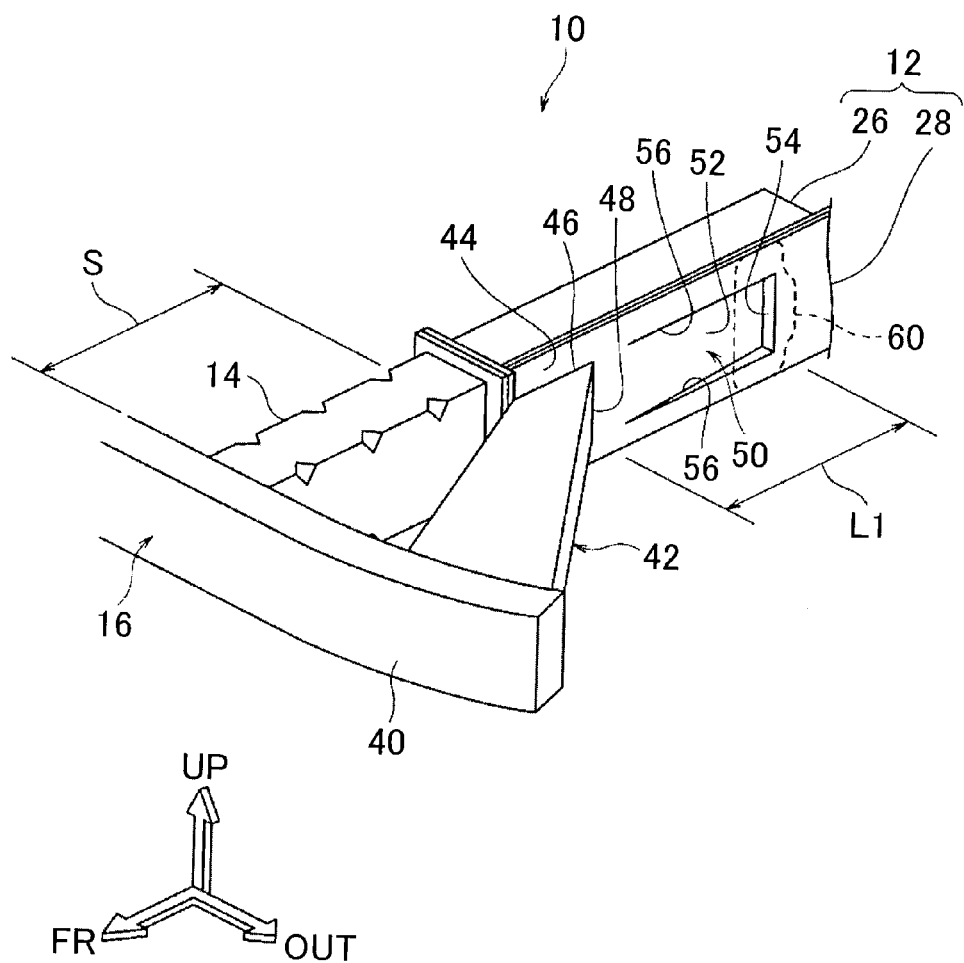
FIG. 1 is a perspective view of a vehicle body front structure of a first embodiment according to the present invention.

A vehicle body front structure 10 of the first embodiment according to the present invention shown in FIG. 1 is, for example, to be applied to a vehicle body front part of vehicles such as a passenger vehicle, and includes a front side member 12, a crush box 14 and a bumper reinforcement 16.

Figure 2:
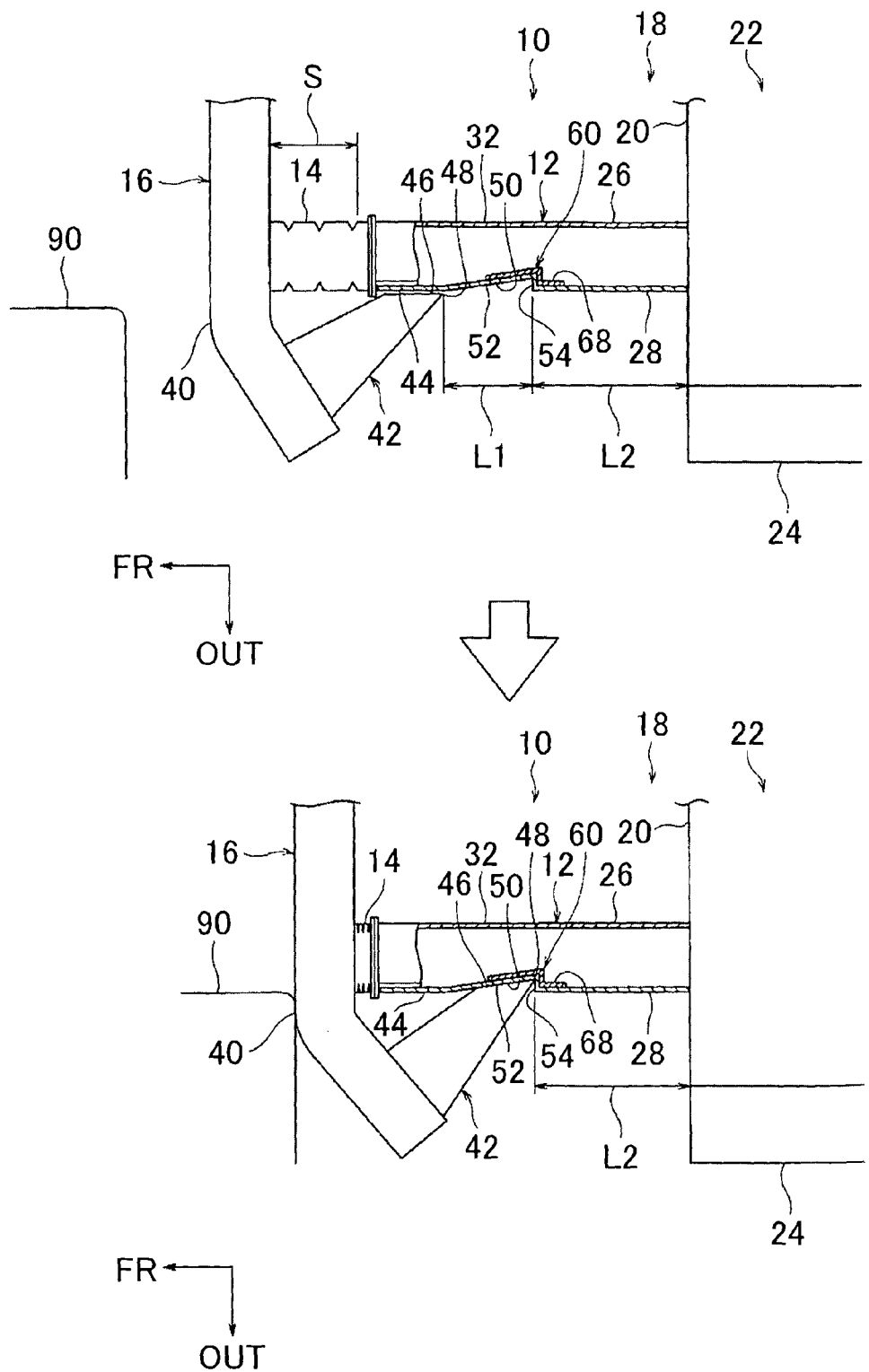
FIG. 2 is a drawing that explains a state of short overlap collision in, the vehicle body front structure shown in FIG. 1 in a plain view.

The front side member 12 is provided outside in the width direction of the vehicle relative to a center portion of the vehicle body front part in the width direction of the vehicle, and extends in the longitudinal direction of the vehicle. As shown in FIG. 2, on the vehicle body front part of the vehicle to which the vehicle body front structure 10 is applied, an engine compartment 18 on which a power source such as an engine is placed is mounted, and the front side member 12 is provided to overlap with the engine compartment 18 in the longitudinal direction of the vehicle.

The engine compartment 18 is separated from a cabin 22 by a dash panel 20 placed setting the longitudinal direction of the vehicle as a thickness direction of the dash panel 20. On a side portion of the cabin 22, a locker 24 constituted by a framework member extending in the longitudinal direction of the vehicle is mounted. Moreover, the front side member 12 described above includes a front side member inner 26 and a front side member outer 28 divided in the width direction of the vehicle.

Figure 3:
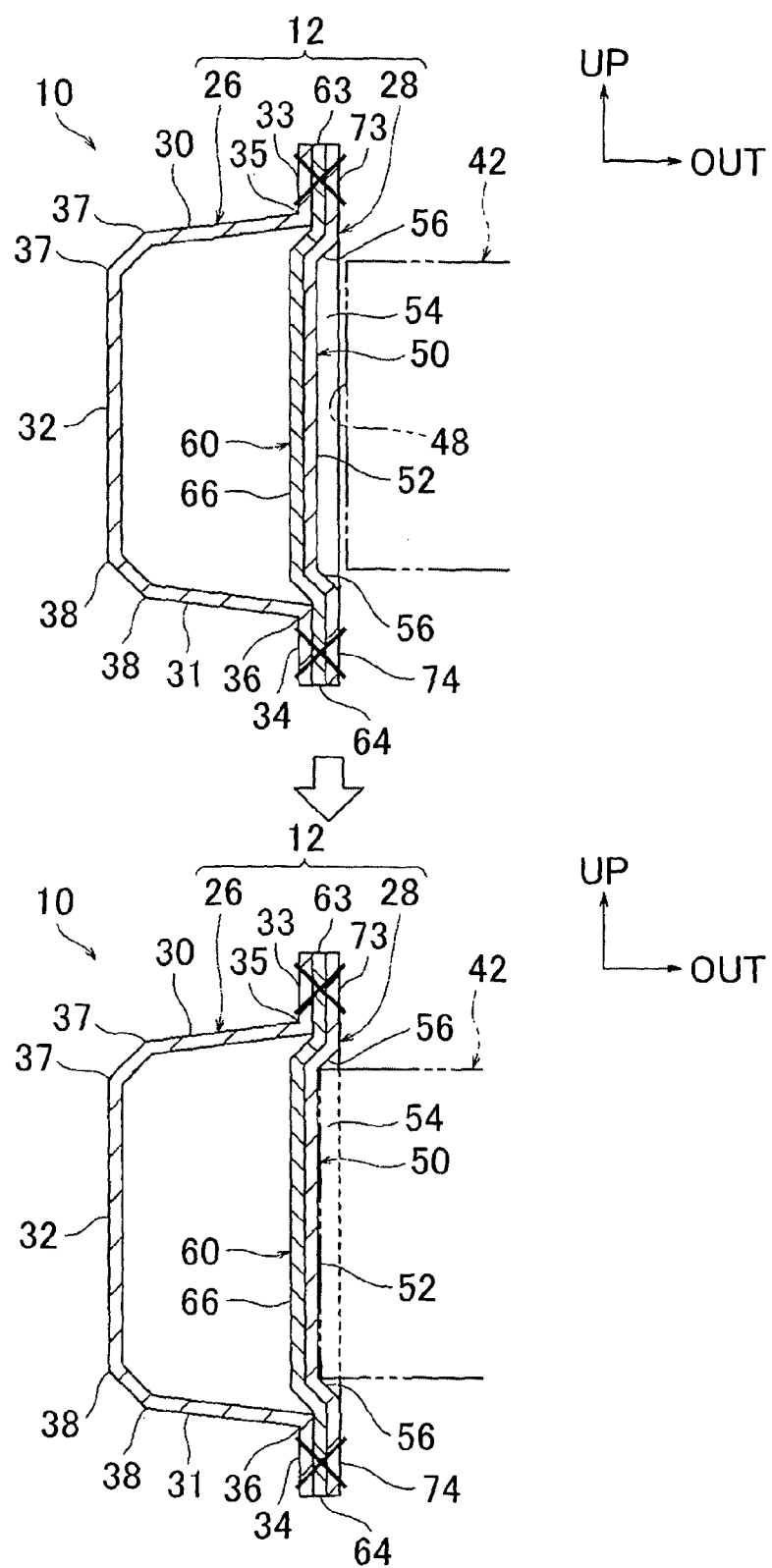
FIG. 3 is a drawing that explains a state of short overlap collision in the vehicle body front structure shown in FIG. 1 in a front cross-sectional view.

As shown in FIG. 3, the front side member inner 26 has a hat-shaped cross-section opened outward in the width direction of the vehicle. That is, the front side member inner 26 has an upper wall portion 30, a lower wall portion 31, a side wall portion 32, an upper flange 33 and a lower flange 34. The upper wall portion 30 and the lower wall portion 31 are apart from each other in the vertical direction of the vehicle, and the side wall portion 32 connects inner ends of the upper wall portion 30 and the lower wall portion 31 in the width direction of the vehicle. The upper flange 33 extends to the upper side of the vehicle from an outer end of the upper wall portion 30 in the width direction of the vehicle, and the lower flange 34 extends to the lower side of the vehicle from an outer end of the lower wall portion 31 in the width direction of the vehicle.

An edge line 35 is formed on a corner portion between the upper wall portion 30 and the upper flange 33, and an edge line 36 is formed on a corner portion between the lower wall portion 31 and the lower flange 34. Moreover, a corner portion between the upper wall portion 30 and the side wall portion 32 is chamfered and a pair of edge lines 37 is formed on both end portions of the chamfered portion. Likewise, a corner portion between the lower wall portion 31 and the side wall portion 32 is chamfered and a pair of edge lines 38 is formed on both end portions of the chamfered portion. The plurality of edge lines 35 to 38 respectively extend in the longitudinal direction of the vehicle.

Figure 4:
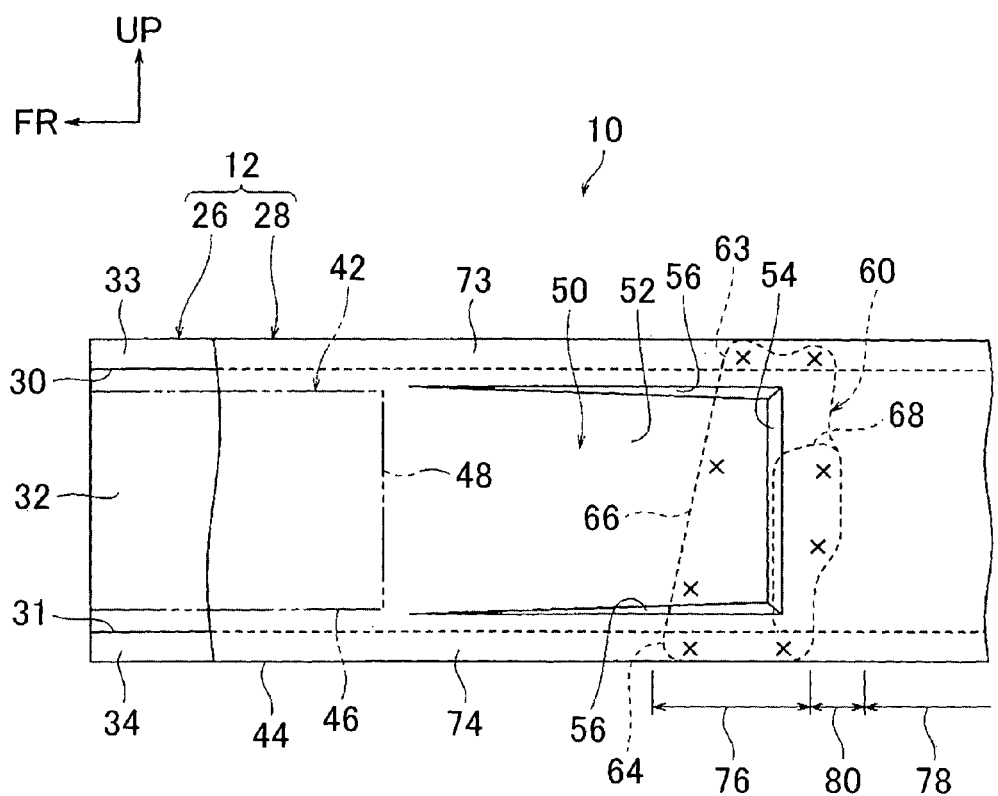
FIG. 4 is a side view of a peripheral portion of a recess of a front side member shown in FIG. 1.

The front side member outer 28 is formed to be planar and placed outside in the width direction of the vehicle relative to the front side member inner 26. As shown in FIG. 4, an upper end portion and a lower end portion of the front side member outer 28 are respectively connected to the upper flange 33 and the lower flange 34. Since the front side member inner 26 and the front side member outer 28 are thus connected, a cross section of the front side member 12 seen along the longitudinal direction of the vehicle is a closed cross section (see also FIG. 3).

As shown in FIG. 1, the crush box 14 is placed on the same axis as that of the front side member 12 and on the front side of the front side member 12 in the longitudinal direction of the vehicle. This crush box 14 is fixed to a front end portion of the front side member 12 by flange connection etc. A cross section of the crush box 14 seen along the longitudinal direction of the vehicle is substantially rectangular.

Moreover, the crush box 14 is set to have lower compressive strength in the longitudinal direction of the vehicle than that of the front side member 12. As means that sets the compressive strength of the crush box 14 lower than that of the front side member 12, for example, dividing edge lines formed on four corners of the crush box 14 whose cross section is rectangular by a notch etc. can be applied. Additionally, as another means, setting the board thickness of the crush box 14 thinner, forming the crush box 14 with a low strength material and the like may be appropriately selected.

The bumper reinforcement 16 is formed to be elongate and extends in the width direction of the vehicle. This bumper reinforcement 16 is fixed to a front end portion of the front side member 12 via the crush box 14. An extending portion 40 that extends outward in the width direction of the vehicle is formed outside in the width direction of the vehicle relative to a portion of the bumper reinforcement 16 connected to the crush box 14. This extending portion 40 is formed to be bent or curved to the back side of the vehicle.

A spacer 42 is provided on the back side of the extending portion 40 in the longitudinal direction of the vehicle. The spacer 42 protrudes rearward in the longitudinal direction of the vehicle from the extending portion 40, and a rear end portion of the spacer 42 reaches a front end portion of the front side member 12. An opposite portion 46 is formed on this rear end portion of the spacer 42. The opposite portion 46 is opposite an outer side wall portion of the front end portion of the front side member 12 in the width direction of the vehicle. The outer side wall portion of the front end portion of the front side member 12 corresponds to a front end portion 44 of the front side member outer 28. Moreover, a corner portion formed on the rear end of the spacer 42 is formed as an engaging portion 48.

On the other hand, a recess 50 that is recessed inward the width direction of the vehicle is formed on the outer side wall portion of the front side member 12 in the width direction of the vehicle. More concretely, the recess 50 is formed behind the front end portion 44 of the front side member outer 28 in the longitudinal direction of the vehicle. As shown in FIG. 4, the recess 50 has a rectangular shape seen from the outer side in the width direction of the vehicle. The recess 50 is constituted by a bottom wall portion 52, a stepped portion 54 and a pair of upper and lower guide portions 56. The stepped portion 54 is formed at the back side of the bottom wall portion 52 in the longitudinal direction of the vehicle. Each of the guide portions 56 extends forward in the longitudinal direction of the vehicle from both ends of the stepped portion 54 in the vertical direction of the vehicle.

As shown in FIG. 2, the bottom wall portion 52 is inclined inward in the width direction of the vehicle relative to the longitudinal direction of the vehicle as the bottom wall portion 52 goes to the backside of the vehicle. The front end portion 44 of the front side member outer 28 is formed in front of this bottom wall portion 52 in the longitudinal direction of the vehicle. The bottom wall portion 52 is formed continuously from the front end portion 44 of the front side member outer 28 in the longitudinal direction of the vehicle.

The stepped portion 54 is a part of the front side member outer 28, and is constituted by a wall portion of the back side of the recess 50 in the longitudinal direction of the vehicle. A thickness direction of the stepped portion 54 is equal to the longitudinal direction of the vehicle. This stepped portion 54 is apart from the back side of the engaging portion 48. The pair of guide portions 56 is formed by an upper wall portion and a lower wall portion of the recess 50 in the vertical direction of the vehicle. The pair of guide portions 56 is tapered such that an interval between the guide portions 56 becomes wider as the guide portions 56 go to the front side of the vehicle. Moreover, the interval between the pair of guide portions 56 is secured to be longer than the length of the engaging portion 48 in the vertical direction of the vehicle described above.

Moreover, the recess 50 having the stepped portion 54 and the pair of guide portions 56 is formed to have substantially the same height as that of the spacer 42 (engaging portion 48) such that the engaging portion 48 is engaged with the stepped portion 54 in accordance with movement of the spacer 42 to the back side of the vehicle as will be described later. A distance L1 between the engaging portion 48 and the stepped portion 54 along the longitudinal direction of the vehicle is set to be the same (substantially the same) as, a compression stroke S of the crush box described above. The compression stroke S in this crush box 14 corresponds to a moving distance of the front end portion of the crush box 14 that moves to the back side of the vehicle until the crush box 14 is subjected to the compressive deformation (completely compressed).

Also, as shown in FIG. 4, on an inner face in the width direction of the vehicle of the front side member outer 28, a reinforcement patch 60 is attached to overlap with the stepped portion 54. This reinforcement patch 60 extends in the vertical direction of the vehicle to have substantially the same length as that of the front side member 12 in the vertical direction of the vehicle.

An upper end portion 63 of the reinforcement patch 60 is coupled to an upper flange 33 formed on the front side member inner 26 and an upper end portion 73 of the front side member outer 28 in the state that the upper end portion 63 is sandwiched between the upper flange 33 and the upper end portion 73. Likewise, a lower end portion 64 of the reinforcement patch 60 is coupled to a lower flange 34 formed on the front side member inner 26 and a lower end portion 74 of the front side member outer 28 in the state that the lower end portion 64 is sandwiched between the lower flange 34 and the lower end portion 74. Moreover, a center portion in the vertical direction of the vehicle of the reinforcement patch 60 is welded to the front side member outer 28 in an appropriate portion.

Figure 5:
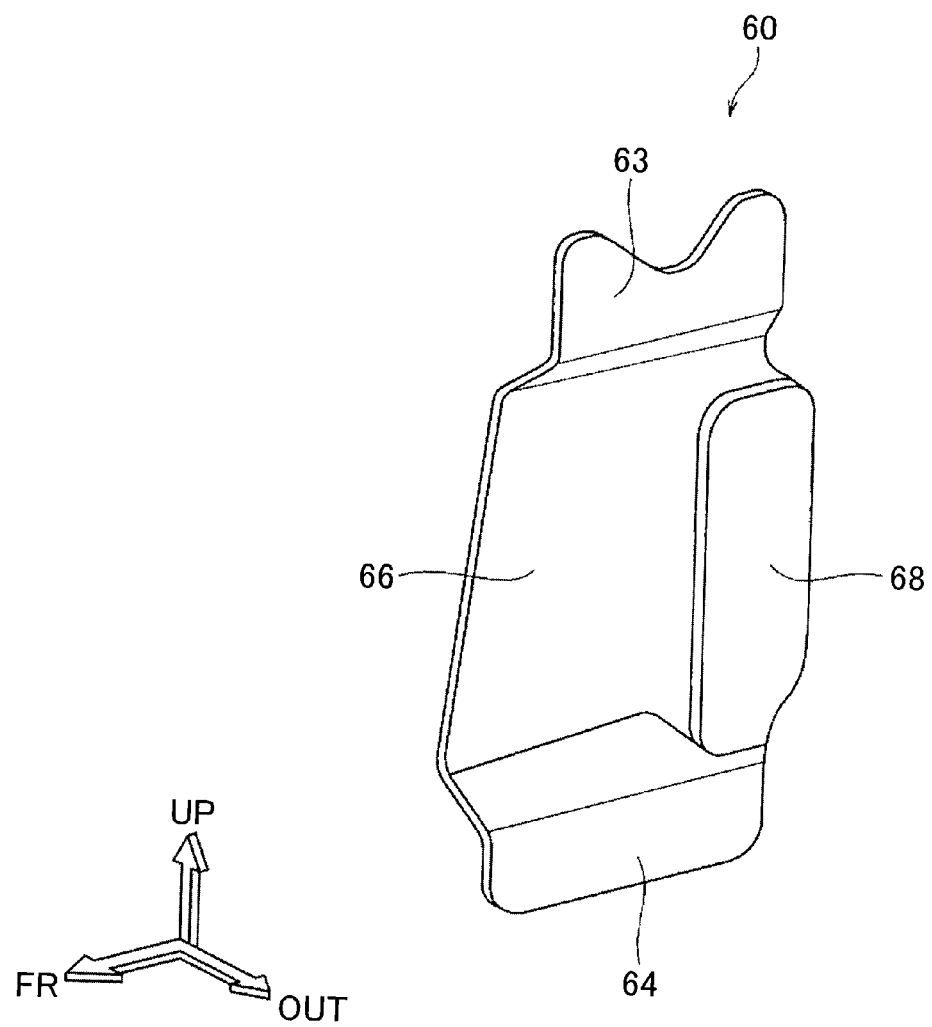
FIG. 5 is a perspective view of a reinforcement patch shown in FIG. 1.

In addition, as shown in FIG. 5, a main body 66 of the reinforcement patch 60 is formed between the upper end portion 63 and the lower end portion 64, and this main body 66 is offset inward in the width direction of the vehicle relative to the upper end portion 63 and the lower end portion 64 corresponding to the bottom wall portion 52 of the recess 50 described above (see FIG. 4). Moreover, a bead 68 that extends in the vertical direction of the vehicle and bulges outward in the width direction of the vehicle is formed on a rear end portion of the main body 66. As shown in FIG. 4, this bead 68 abuts (or is close to), the stepped portion 54 from the back side in the longitudinal direction of the vehicle relative to the stepped portion 54.

Moreover, although it is not particularly detailed in FIG. 4, structures such as a stabilizer bracket and a suspension tower mounting bracket are respectively attached on a first mounting area 76 and a second mounting area 78 of the front side member 12. Further, in this front side member 12, the first mounting area 76 and the second mounting area 78 are made to be a high rigidity portion with the attachment of each of the structures. On the other hand, in the front side member 12, a range between the first mounting are 76 and the second mounting area 78 is set to be a deformation start point 80 when the front side member 12 is bent inward in the width direction of the vehicle in the event of collision as will be described later. That is, the range between the first mounting are 76 and the second mounting area 78 is made to be a lower rigidity area than that of the first mounting area 76 and the second mounting area 78.

While the vehicle body front structure 10 is applied to the left side of the vehicle body front part in the first embodiment of the present invention, the vehicle body front structure 10 may be applied to the right side of the vehicle body front part. Alternatively, the vehicle body front structure 10 may be applied to both the left and right sides of the vehicle body front part.

Next, an operation and an effect of the first embodiment of the present invention will be explained.

As shown in FIG. 2, in the vehicle body front structure 10 of the first embodiment according to the present invention, when, for example, the collision load from a collision body 90 acts on the extending portion 40 from the front side of the vehicle body in the event of short overlap collision, the crush box 14 is subjected to the compressive deformation. During this compressive deformation of the crush box 14 (within the range of the distance L1), since the engaging portion 48 does not interfere with the stepped portion 54, the movement of the spacer 42 toward the back side of the vehicle relative to the front side member 12 is allowed. Accordingly, in an initial stage of collision, as shown in the lower drawing of FIG. 2, the collision energy can be absorbed by the compressive deformation of the crush box 14.

Especially, in this vehicle body front structure 10, as described above, during the compressive deformation of the crush box 14, the engaging portion 48 is maintained to be apart from the stepped portion 54. Consequently, limitation of the movement of the spacer 42, before the compressive deformation of the crush box 14, toward the back side of the vehicle relative to the front side member 12 can be inhibited. Therefore, in the initial stage of collision, the collision energy can be efficiently absorbed by the crush box 14.

On the other hand, after the compressive deformation of the crush box 14 with the progress of the collision, as shown in the lower drawing of FIG. 2, the engaging portion 48 is engaged with the stepped portion 54, so that the movement of the spacer 42 toward the back side of the vehicle relative to the front side member 12 is inhibited. Moreover, the collision load is transmitted from the spacer 42 to the front side member 12 via the engaging portion 48 and the stepped portion 54. Consequently, at the stage that the collision is progressed, an axial load (reaction force) can be increased by the front side member 12. Therefore, the amount of energy absorption in an engine compartment 18 can be increased.

In addition, after the crush box 14 is subjected to the compressive deformation as described above, the engaging portion 48 is engaged with the stepped portion 54 and the movement of the spacer 42 toward the back side of the vehicle relative to the front side member 12 is inhibited. Accordingly, while the axial load is exerted by the front side member 12 immediately after the compressive deformation of the crush box 14, the collision energy can be efficiently absorbed by the front side member 12.

Moreover, the above structure for transmitting the collision load from the spacer 42 to the front side member 12 is constituted by the engaging portion 48 formed on the spacer 42 and the stepped portion 54 formed on a part of the front, side member outer 28. Consequently, compared to the structure having the first protruding portion protruding to the back side of the vehicle from the extending portion and the second protruding portion protruding to the outer side in the width direction of the vehicle from the front side member as in the related art for example, a simple structure can be achieved, which achieves weight saving of the vehicle body front part.

In addition, the pair of guide portions 56 extending from the upper and lower ends of the stepped portion 54 in the vertical direction of the vehicle toward the front side of the vehicle is formed on the front side member outer 28. Accordingly, the engaging portion 48 can be guided by the pair of guide portions 56, so that the engaging portion 48 can be smoothly engaged with the stepped portion 54. Moreover, the stepped portion 54 and the pair of guide portions 56 can be formed on the front side member outer 28 by forming the recess 50 on the front side member outer 28, the recess 50 being recessed inward in the width direction of the vehicle. Thus the stepped portion 54 and the pair of guide portions 56 can be easily formed.

Also, the reinforcement patch 60 is attached on the inner face of the front side member outer 28 in the width direction of the vehicle to overlap with the stepped portion 54. Consequently, rigidity of a peripheral portion of the stepped portion 54 can be improved by this reinforcement patch 60. Therefore, in a state that the engaging portion 48 is engaged with the stepped portion 54, the collision load can be transmitted from the spacer 42 to the front side member 12 more efficiently.

Moreover, the upper end portion 63 of the reinforcement patch 60 is coupled to the upper flange 33 formed on the front side member inner 26 and the upper end portion 73 of the front side member outer 28 in the state that the upper end portion 63 is sandwiched between the upper flange 33 and the upper end portion 73. Likewise, the lower end portion 64 of the reinforcement patch 60 is coupled to the lower flange 34 formed on the front side member inner 26 and the lower end portion 74 of the front side member outer 28 in the state that the lower end portion 64 is sandwiched between the lower flange 34 and the lower end portion 74. Accordingly, in the state that the engaging portion 48 is engaged with the stepped portion 54, the collision load transmitting via the spacer 42 can be transmitted to the edge lines 35 to 38 of the front side member inner 26. Thus, the axial load (reaction force) by the front side member 12 can be further increased.

Moreover, in the event of slight collision in which a less collision load than a load that is defined with respect to short overlap collision acts, since the engaging portion 48 is maintained to be apart from the stepped portion 54, the crush box 14 can be subjected to the compressive deformation while deformation of the front side member 12 is inhibited. That is, the compression stroke of the crush box 14 can be maintained. Therefore, the collision energy in the slight collision can be absorbed.

Also, in this slight collision, the compressive deformation is performed only to the crush box 14, and deformation of the front side member 12 can be inhibited. Consequently, repair of the front side member 12 at the time of the slight collision can be avoided.

Additionally, in a case where, in the state that the engaging portion 48 is engaged with the stepped portion 54 as shown in the lower drawing of FIG. 2, the collision is further progressed and the rear end portion of the spacer 42 moves within a range of a distance L2 (a distance from the dash panel 20 along the longitudinal direction of the vehicle) toward the back side of the vehicle, the collision load is transmitted from the spacer 42 to the front side member 12 via the engaging portion 48 and the stepped portion 54. After that, the front side member 12 is subjected to the compressive deformation while exerting the axial load (reaction force).

Also, in this instance, in accordance with bending of the extending portion 40 inward in the width direction of the vehicle, the opposite portion 46 formed on the rear end portion of the spacer 42 abuts the bottom wall portion 52 of the recess 50, and a load toward the inner side in the width direction of the vehicle acts on the front side member 12 from the rear end portion of the spacer 42. Further, the front side member 12 is bent inward in the width direction of the vehicle at the deformation start point 80. In this way, the front side member 12 absorbs the collision energy when the front side member 12 is subjected to the compressive deformation while exerting the axial load and bent inward in the width direction of the vehicle.

Figure 6:
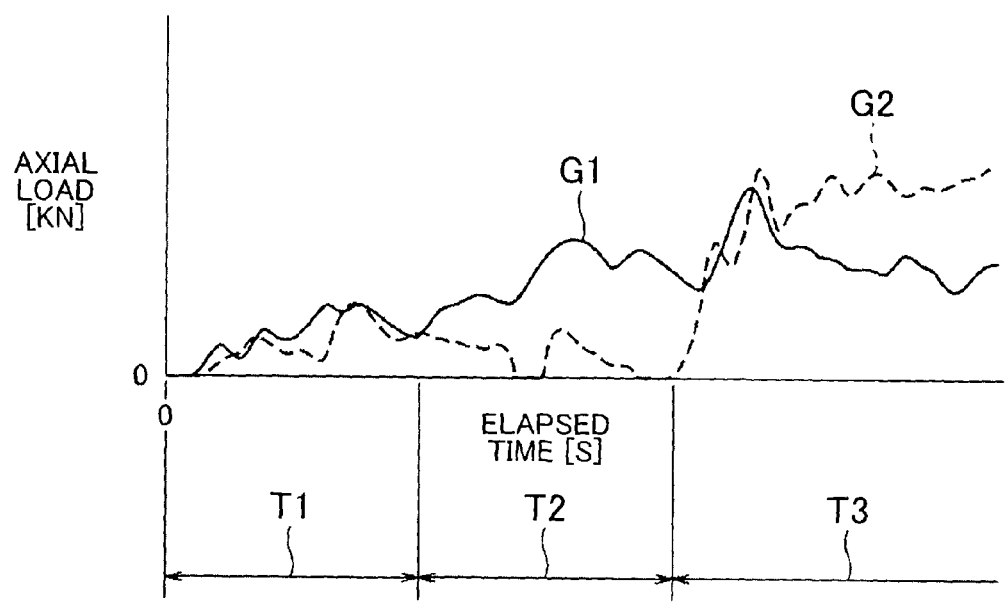
FIG. 6 is a drawing that shows the relationship between an elapsed time and an axial load in the event of short overlap collision in the vehicle body front structure shown in FIG. 1.

Here, FIG. 6 shows the relationship between an elapsed time and the axial load in the event of short overlap collision in the vehicle body front structure 10 of the first embodiment according to the present invention. In FIG. 6, the abscissa axis shows the elapsed time [s], and the ordinate axis shows the axial load of the crush box 14 and the front side member 12 shown in FIG. 1, that is, a reaction force to a collision body [kN].

Also, a solid line graph G1 shows about the first embodiment, and a dashed line graph G2 shows about a comparable example. The comparable example has a structure that the recess 50 shown in FIG. 1 is omitted from the first embodiment of the present invention.

Moreover, a period T1 of FIG. 6 shows a time that the rear end portion of the spacer 42 moves within the range of distance L1 while the crush box 14 shown in FIG. 1 is subjected to the compressive deformation, and a period T2 of FIG. 6 shows a time that the rear end portion of the spacer 42 moves within the range of distance L2 after the crush box 14 shown in FIG. 1 is subjected to the compressive deformation. Additionally, when the rear end portion of the spacer 42 moves within the range of distance L2, a not shown front wheel abuts the locker 24. A period T3 of FIG. 6 shows after the time when the not shown front wheel abuts the locker 24. That is, in the periods T1 to T2, energy is absorbed in the engine compartment 18, and in the period T3, energy is absorbed in the cabin 22.

As shown in FIG. 6, in the period T1, the first embodiment of the present invention and the comparative example show similar axis loads. On the other hand, in the period T2, the axial load in the first embodiment of the present invention increases compared to the axis load of the comparative example. Accordingly, as clear from FIG. 6, according to the first embodiment of the present invention, it can be said that at the initial stage of collision, the collision energy can be absorbed by the compressive deformation of the crush box 14, and at the stage that the collision is progressed, the axial load (reaction force) can be increased by the front side member 12.

Next, an alternative embodiment of the first embodiment of the present invention will be explained.

In the first embodiment of the present invention, the spacer 42 is separately formed from the bumper reinforcement 16. However, the spacer 42 may be formed integrally with the bumper reinforcement 16.

Moreover, in the first embodiment of the present invention, the stepped portion 54 is formed on the front side member outer 28 by forming the recess 50 on the front side member outer 28. However, the stepped portion 54 may be formed on the front side member outer 28 without forming the recess 50 on the front side member outer 28.

In addition, the distance L1 between the engaging portion 48 and the stepped portion 54 along the longitudinal direction of the vehicle is set to be the same (substantially the same) as the compression stroke S in the crush box 14. In this way, it is desirable to set the distance L1 to be the same as the compression stroke S. However, the distance L1 may be set the same as the compression stroke S or more as long as the movement of the spacer 42 toward the back side of the vehicle relative to the front side member 12 can be inhibited after the crush box 14 is subjected to the compressive deformation.

As described above, while the first embodiment of the present invention has been explained, the present invention is not limited to the above and can be executed with various modification other than the above without departing from the gist of the present invention.

Hereinafter, a second embodiment of the present invention will be explained with reference to the drawings.

Incidentally, an arrow UP, an arrow FR and an arrow OUT shown in each drawing that will be explained hereinafter respectively show the upper direction in the vertical direction of the vehicle, the front direction in the longitudinal direction of the vehicle and the outer direction in the width direction of the vehicle (left side of the vehicle).

Figure 7:
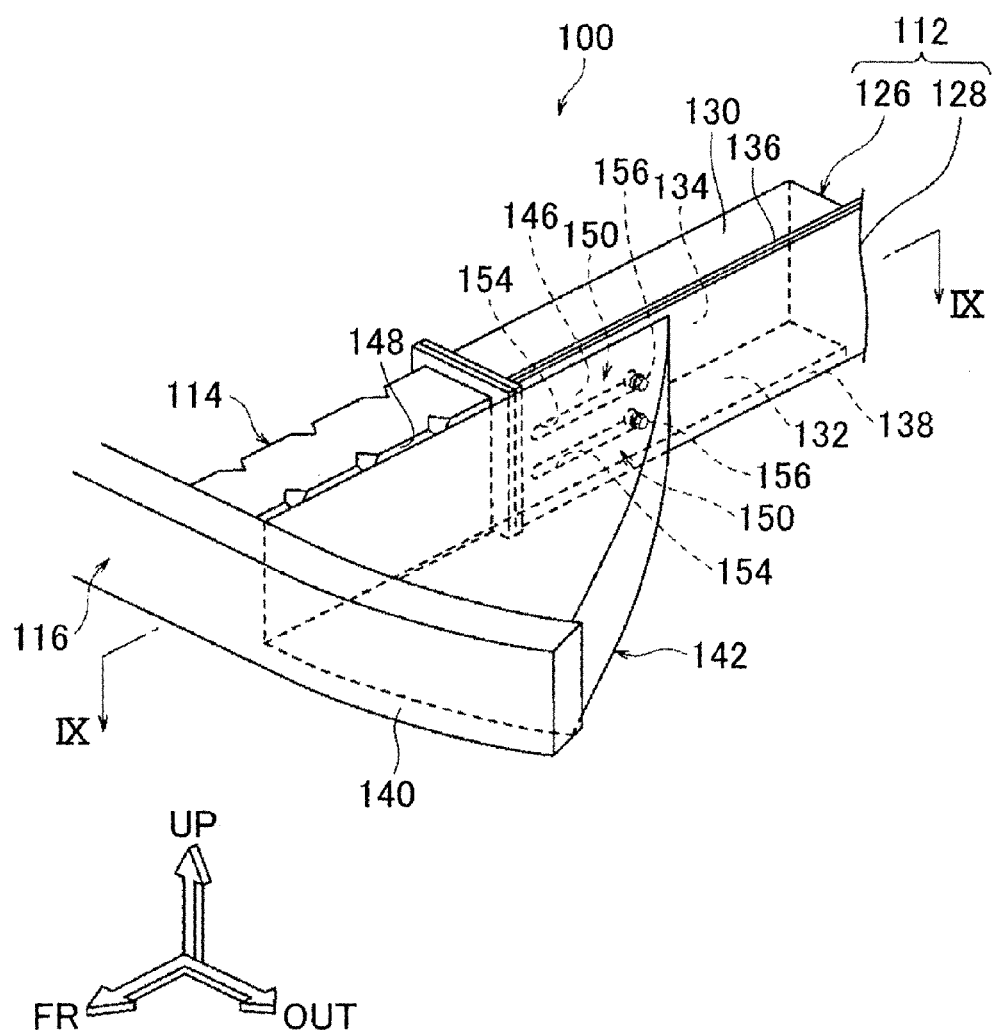
FIG. 7 is a perspective view of a vehicle body front structure of a second embodiment according to the present invention.

A vehicle body front structure 100 of the second embodiment according to the present invention shown in FIG. 7 is to be applied to, for example, a vehicle body front part of a vehicle such as a passenger vehicle, and includes a front side member 112, a crush box 114 and a bumper reinforcement 116.

Figure 8:
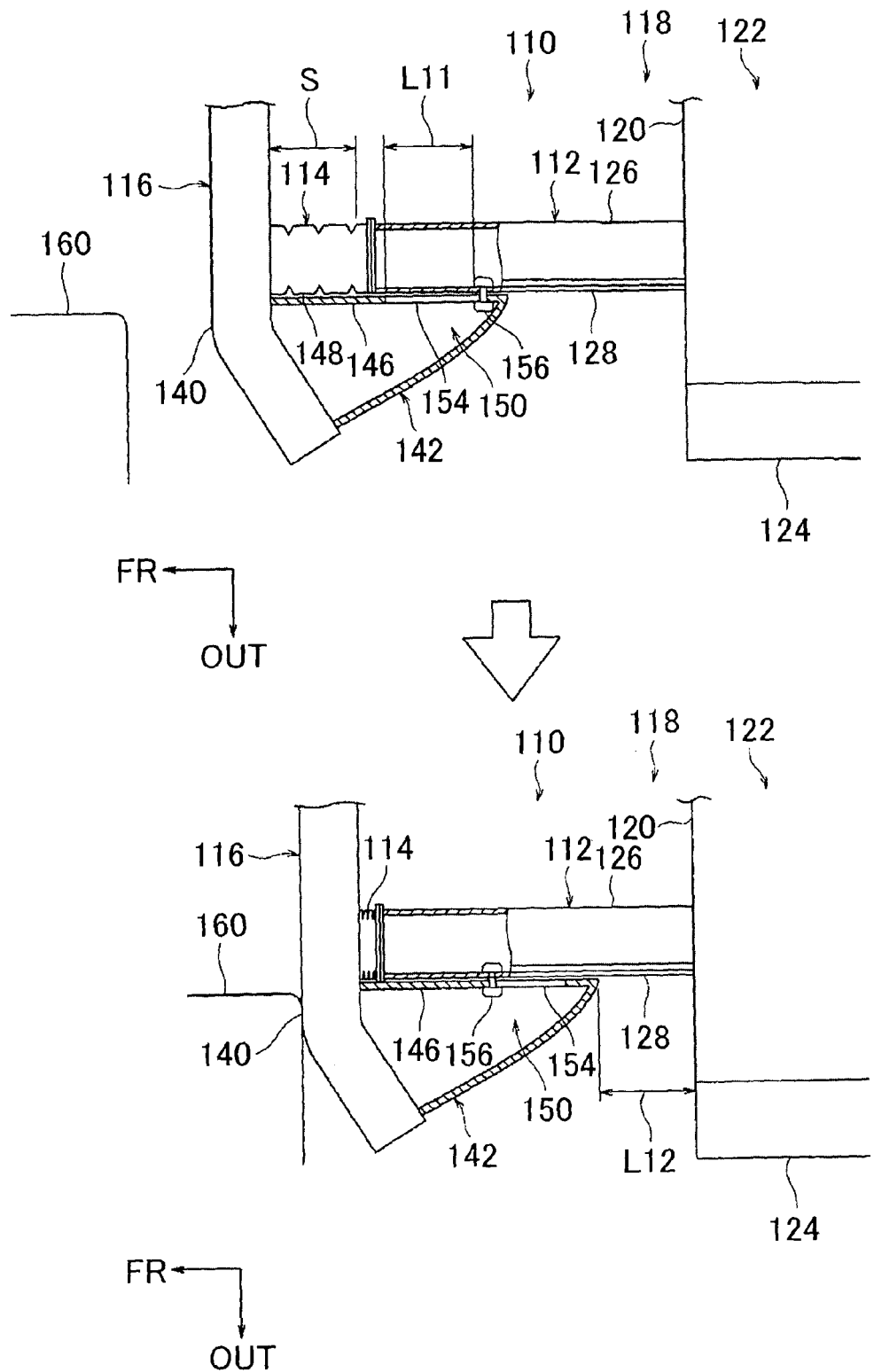
FIG. 8 is a drawing that explains a state of short overlap collision in the vehicle body front structure shown in FIG. 7 in a plain view.

The front side member 112 is provided outside in the width direction of the vehicle relative to a center portion of the vehicle body front part in the width direction of the vehicle, and extends in the longitudinal direction of the vehicle. As shown in FIG. 8, in the vehicle body front part of the vehicle to which the vehicle body front structure 100 is applied, an engine compartment 118 on which a power source such as an engine is placed is mounted, and the front side member 112 is provided to overlap with the engine compartment 118 in the longitudinal direction of the vehicle.

The engine compartment 118 is separated from a cabin 122 by a clash panel 120 placed setting the longitudinal direction of the vehicle as the thickness direction of the dash panel 120. A locker 124 constituted by a framework member extending in the longitudinal direction is mounted on the side portion of the cabin 122. Moreover, the front side member 112 described above includes a front side member inner 126 and a front side member outer 128 divided in the width direction of the vehicle.

As shown in FIG. 7, the front side member inner 126 has a hat-shaped cross-section opened outward in the width direction of the vehicle. That is, the front side member inner 126 has an upper wall portion 130, a lower wall portion 132, a side wall portion 134, an upper flange 136 and a lower flange 138. The upper wall portion 130 and the lower wall portion 132 are apart from each other in the vertical direction of the vehicle, and the side wall portion 134 connects inner ends in the width direction of the vehicle of the upper wall portion 130 and the lower wall portion 132. The upper flange 136 extends to the upper side of the vehicle from an outer end in the width direction of the vehicle of the upper wall portion 130. The lower flange 138 extends to the lower side of the vehicle from an outer end in the width direction of the vehicle of the lower wall portion 132.

The front side member outer 128 is formed to be planar and placed outside in the width direction of the vehicle relative to the front side member inner 126. An upper end portion and a lower end portion of the front side member outer 128 are respectively connected to the upper flange 136 and the lower flange 138. Since the front side member inner 126 and the front side member outer 128 are thus connected, a cross section of the front side member 112 seen along the longitudinal direction of the vehicle is a closed cross section.

The crush box 114 is placed on the same axis as that of the front side member 112 and on the front side of the front side member 112 in the longitudinal direction of the vehicle. This crush box 114 is fixed to a front end portion of the front side member 112 by flange connection etc. A cross section of the crush box 114 seen along the longitudinal direction of the vehicle is substantially rectangular.

Moreover, the crush box 114 is set to have lower compressive strength in the longitudinal direction of the vehicle than that of the front side member 112. As means that sets the compressive strength of the crush box 114 lower than that of the front side member 112, for example, dividing edge lines formed on four corners of the crush box 114 whose cross section is rectangular by a notch etc. can be applied. Additionally, as another means, setting the thickness of the crush box 114 thinner, forming the crush box 114 with a low strength material and the like may be appropriately selected.

The bumper reinforcement 116 is formed to be elongate and extends in the width direction of the vehicle. This bumper reinforcement 116 is fixed to a front end portion of the front side member 112 via the crush box 114. An extending portion 140 that extends to the outer side in the width direction of the vehicle is formed outside in the width direction of the vehicle relative to a portion of the bumper reinforcement 116 connected to the crush box 114. This extending portion 140 is formed to be bent or curved to the back side of the vehicle.

A spacer 142 is provided on the back side of the vehicle of the extending portion 140. The spacer 142 has a roughly triangular shape seen from a planar view having a peak on its rear end portion and the base on a front end portion. The spacer 142 protrudes from the extending portion 140 to the back side of the vehicle. A side wall portion 146 on the inner side of the spacer 142 in the width direction of the vehicle is formed along a side wall portion 148 on the outer side of the crush box 114 in the width direction of the vehicle (see also FIG. 8). Moreover, a rear end portion of the spacer 142 reaches a front end portion of the front side member 112.

Figure 9:
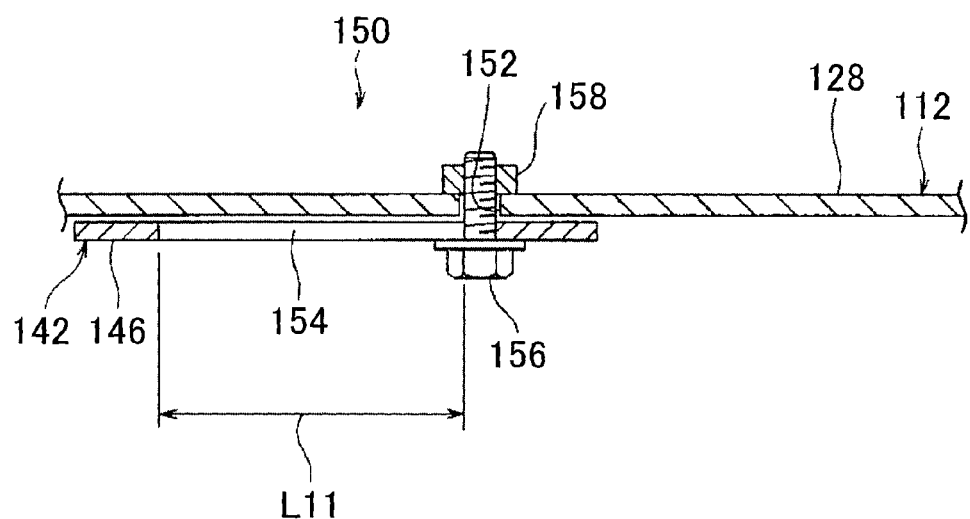
FIG. 9 is a drawing that explains a state of a peripheral portion of a slit and a bolt shown in FIG. 8 in a planar cross-sectional view.
Figure 9:
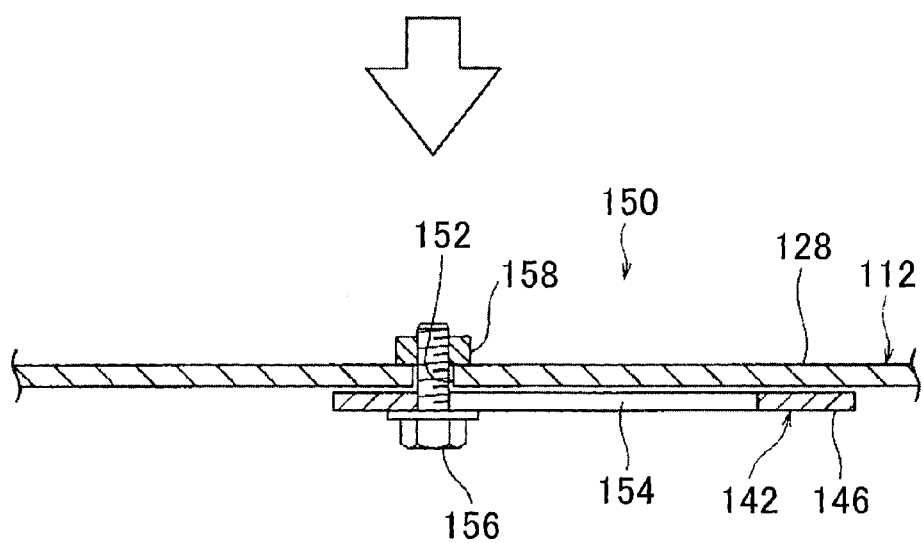

As shown in FIG. 9, upper and lower load transmission adjustment portions 150 are provided on a side wall portion of the front side member 112 (front side member outer 128) outside in the width direction of the vehicle and the side wall portion 146 of the spacer 142 inside in the width direction of the vehicle. Each load transmission adjustment portion 150 is to adjust the timing of load transmission from the spacer 142 to the front side member 112 as will be described later, and includes a hole 152 formed on the front side member outer 128, a slit 154 formed on the side wall portion 146 of the spacer 142, a bolt 156 and a nut 158. The bolt 16 may be regarded as a pin portion of the present invention.

The slit 154 extends in the longitudinal direction of the vehicle, and the bolt 156 is sequentially inserted into a rear end portion of the slit 154 and the hole 152 from the outer side in the width direction of the vehicle. The bolt 156 is fixed to the front side member 112 with its insertion into the hole 152. The nut 158 is threaded into a distal end portion of the bolt 156 from the inner side in the width direction of the vehicle, whereby the spacer 142 is fastened to the front side member 112.

As shown in the upper drawing of FIG. 9, in a normal state (the state that the crush box 114 is not subjected to the compressive deformation), the bolt 156 is engaged with the rear end portion of the slit 154. A distance L11 between a front end portion of the slit 154 and the bolt 156 along the longitudinal direction of the vehicle is set to be the same (substantially the same) as the compression stroke S in the crush box 114 described above. The compression stroke S in the crush box 114 corresponds to a moving distance of a front end portion of the crush box 114 that moves to the back side of the vehicle until the crush box 114 is subjected to the compressive deformation (completely compressed).

Additionally, while the case where the vehicle body front structure 100 is applied to the left side of the vehicle body front part is explained in the second embodiment of the present invention, the vehicle body front structure 100 may be applied to the right side of the vehicle body front part, or may be applied to both the left side of the vehicle body front part and the right side of the vehicle body front part.

Next, an operation and an effect of the second embodiment of the present invention will be explained.

As shown in FIG. 8, in the vehicle body front structure 100 of the second embodiment according to the present invention, for example, when a collision load from a collision body 160 acts on the extending portion 140 from the front side of the vehicle in the event of short overlap collision, the crush box 114 is subjected to the compressive deformation. During this compressive deformation of the crush box 114 (within the range of the distance L11), the bolt 156 relatively moves in the slit 154, so that the movement of the spacer 142 toward the back side of the vehicle relative to the front side member 112 is allowed. Accordingly, in an initial stage of the collision, as shown in the lower drawing of FIG. 8, the collision energy can be absorbed by the compressive deformation of the crush box 114.

Especially, in this vehicle body front structure 100, as described above, during the compressive deformation of the crush box 114, the pin portion relatively moves in the slit 154. Accordingly, limitation of the movement of the spacer 142, before the compressive deformation of the crush box 114, toward the back side of the vehicle relative to the front side member 112 can be inhibited. Because of this, in the initial stage of the collision, collision energy can be absorbed efficiently by the crush box 114.

On the other hand, after the compressive deformation of the crush box 114 with the progress of the collision, as shown in the lower drawing of FIG. 8 (see also the lower drawing of FIG. 9), the bolt 156 is engaged with the front end portion of the slit 154, so that the movement of the spacer 142 toward the back side of the vehicle relative to the front side member 112 is inhibited. Moreover, the collision load is transmitted from the spacer 142 to the front side member 112 via the front end portion of the slit 154 and the bolt 156. Accordingly, at the stage that the collision is progressed, the axial load (reaction force) can be increased by the front side member 112. Therefore, the amount of energy absorption in the engine compartment 118 can be increased.

Also, after the compressive deformation of the crush box 114 as described above, the bolt 156 is engaged with the front end portion of the slit 154, so that the movement of the spacer 142 toward the back side of the vehicle relative to the front side member 112 is inhibited. Accordingly, while the axial load is exerted by the front side member 112 immediately after the compressive deformation of the crush box 114, the collision energy can be efficiently absorbed by the front side member 112.

Moreover, the above structure for transmitting the collision load from the spacer 142 to the front side member 112 is constituted by the slit 154 formed on the side wall portion 146 of the spacer 142 and the bolt 156 inserted in the slit 154. Consequently, compared to the structure having the first protruding portion protruding to the back side of the vehicle from the extending portion and the second protruding portion protruding to the outer side in the width direction of the vehicle from the front side member as in the related art, a simple structure can be achieved, which achieves space saving in the lateral side of the crush box 114 and the front side member 112 and weight saving of the vehicle body front part.

Moreover, in the event of slight collision in which a less collision load than a load that is defined with respect to short overlap collision acts, since the bolt 156 relatively moves with respect to the slit 154, the crush box 114 can be subjected to the compressive deformation while deformation of the front side member 112 is inhibited. That is, the compression stroke of the crush box 114 can be maintained. Therefore, the collision energy in the slight collision can be absorbed.

Also, in this slight collision, the compressive deformation is performed only to the crush box 114, and deformation of the front side member 112 can be inhibited. Consequently, repair of the front side member 112 at the time of the slight collision can be avoided.

Moreover, the slit 154 is formed only in the spacer 142 of the front side member 112 and the spacer 142. Accordingly, the structure of the front side member 112 can be simplified and rigidity of the front side member 112 can be secured.

Additionally, in a case where, in the state that the bolt 156 is engaged with the front end portion of the slit 154 as shown in the lower drawing of FIG. 8 (also see the lower drawing of FIG. 9), the collision is further progressed and the rear end portion of the spacer 142 moves within a range of distance L12 (a distance from the dash panel 120 along the longitudinal direction of the vehicle) to the back side of the vehicle, the collision load is transmitted from the spacer 142 to the front side member 112 via the bolt 156 and the front end portion of the slit 154. After that, the front side member 112 is subjected to the compressive deformation while exerting the axial load (reaction force).

Also, in this instance, in accordance with bending of the extending portion 140 to the inner side in the width direction of the vehicle, the rear end portion of the spacer 142 (spacer 142) abuts the front side member outer 128, and a load to the inner side in the width direction of the vehicle acts on the front side member 112 from the rear end portion of the spacer 142. Further, the front side member 112 is bent to the inner side in the width direction of the vehicle at an appropriate portion such as a deformation start point that is previously set. In this way, the front side member 112 absorbs the collision energy when it is subjected to the compressive deformation while exerting the axial load and bent to the inner side in the width direction of the vehicle.

Figure 10:
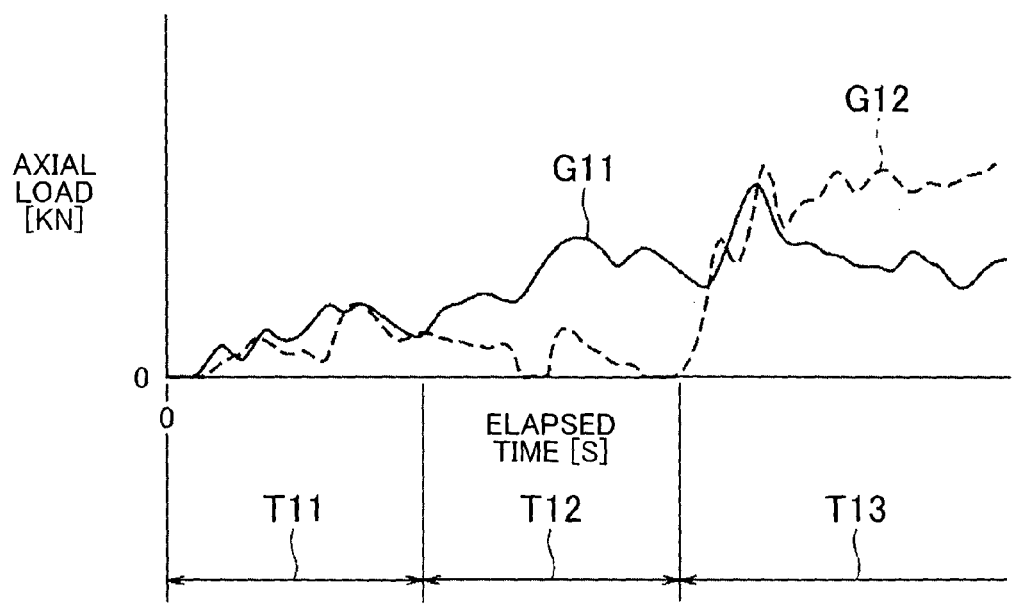
FIG. 10 is a drawing that shows the relationship between the elapsed time and an axial load in the event of short overlap collision in the vehicle body front structure shown in FIG. 7.

Here, FIG. 10 shows the relationship between the elapsed time and the axial load in the event of short overlap collision in the vehicle body front structure 100 of the second embodiment according to the present invention. In FIG. 10, the abscissa axis shows the elapsed time [s], and the ordinate axis shows the axial load of the crush box 114 and the front side member 112 shown in FIG. 7, that is, a reaction force to the collision body 160 [kN].

Also, the solid line graph G11 shows about the second embodiment, and the dashed line graph G12 shows about a comparative example. The comparative example has a structure that the load transmission adjustment portion 150 shown in FIG. 7 is omitted compared to the second embodiment of the present invention.

Moreover, the period T11 of FIG. 10 shows a time that the rear end portion of the spacer 142 moves within the range of distance L11 while the crush box 114 shown in FIG. 7 is subjected to the compressive deformation, and the period T12 of FIG. 10 shows a time that the rear end portion of the spacer 142 moves within the range of distance L12 after the crush box 114 shown in FIG. 7 is subjected to the compressive deformation. Additionally, when the rear end portion of the spacer 142 moves within the range of distance L12, a not shown front wheel abuts the locker 124. The period T13 of FIG. 10 shows after the time when the not shown front wheel abuts the locker 124. That is, in the periods T11 to T12, energy is absorbed in the engine compartment 118, and in the period T13, energy is absorbed in a cabin 122.

As shown in FIG. 10, in the period T11, the second embodiment of the present invention and the comparative example show similar axis loads. On the other hand, in the period T12, an axial load in the second embodiment of the present invention increases compared to the axis load of the comparative example. Accordingly, as clear from FIG. 10, according to the second embodiment of the present invention, it can be said that at the initial stage of collision, the collision energy can be absorbed by the compressive deformation of the crush box 114, and in the stage that the collision is progressed, the axial load (reaction force) can be increased by the front side member 112.

Next, an alternative embodiment of the second embodiment of the present invention will be explained.

In the second embodiment of the present invention, the spacer 142 is separately formed from the bumper reinforcement 116. However, the spacer 142 may be formed integrally with the bumper reinforcement 116.

Moreover, while a pair of the upper and lower load transmission adjustment portions 150 is used in the second embodiment of the present invention, one of the load transmission adjustment portions 150 may be used, or two or more may be arranged with alignment in the vertical direction of the vehicle.

Moreover, while the bolt 156 is used as one example of the pin portion in the second embodiment, a pin member other than the bolt 156 may be used as long as it relatively moves with respect to the slit 154 while engaging with an end portion of the slit 154. In addition, in a case where the slit 154 is formed on only one of the front side member 112 and the spacer 142, a pin member integrally formed with the other of the front side member 112 and the spacer 142 may be used.

In addition, the distance L11 between the front end portion of the slit 154 and the bolt 156 along the longitudinal direction of the vehicle is desirably set to be the same (substantially the same) as the compression stroke S in the crush box 114 as described above. However, the distance L11 may be set as the compression stroke S or more as long as the movement of the spacer 142 toward the back side of the vehicle relative to the front side member 112 can be inhibited after the crush box 114 is subjected to the compressive deformation.

Figure 11:
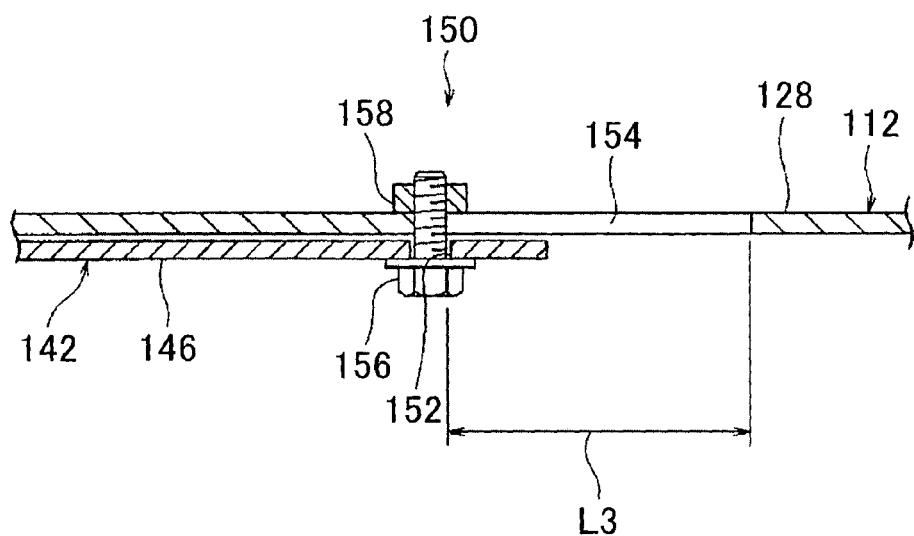
FIG. 11 is a drawing that shows the first alternative embodiment of the vehicle body front structure of the second embodiment according to the present invention.
Figure 11:
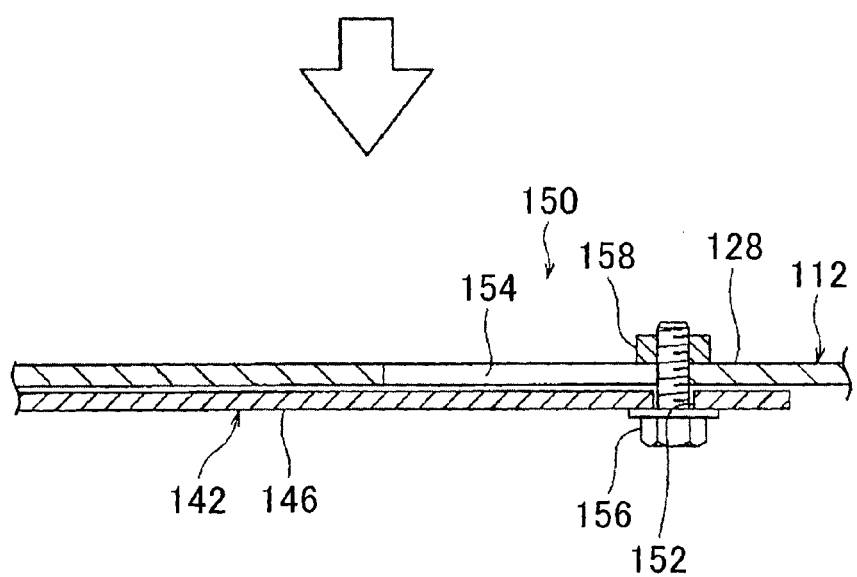

Moreover, in the second embodiment of the present invention, the load transmission adjustment portion 150 may be formed as shown in FIG. 11. That is, in the alternative embodiment shown in FIG. 11, the slit 154 is formed in the front side member outer 128, and the hole 152 is formed on the side wall portion 146 of the spacer 142. In addition, the bolt 156 is sequentially inserted into the hole 152 and the rear end portion of the slit 154 from the outer side in the width direction of the vehicle. The bolt 156 is fixed to the spacer 142 with its insertion into the hole 152.

The nut 158 is threaded into the distal end portion of the bolt 156 from the inner side in the width direction of the vehicle, whereby the spacer 142 is fastened to the front side member 112. As shown in the upper drawing of FIG. 11, in a normal state (the state that the crush box 114 is not subjected to the compressive deformation), the bolt 156 is engaged with the front end portion of the slit 154. A distance L3 between the bolt 156 and the rear end portion of the slit 154 along the longitudinal direction of the vehicle is set to be the same (substantially the same) as the compression stroke S in the crush box 114 described above.

Even with this configuration, during the compressive deformation of the crush box 114 (within the range of the distance L3), the bolt 156 relatively moves with respect to the slit 154, so that the movement of the spacer 142 toward the back side of the vehicle relative to the front side member 112 is allowed. Moreover, after the compressive deformation of the crush box 114 with the progress of the collision, as shown in the lower drawing of FIG. 11, the bolt 156 is engaged with the rear end portion of the slit 154, so that the movement of the spacer 142 toward the back side of the vehicle relative to the front side member 112 is inhibited. Moreover, via the rear end portion of the slit 154 and the bolt 156, the collision load is transmitted from the spacer 142 to the front side member 112.

Moreover, the slit 154 is formed only in the front side member 112 of the front side member 112 and the spacer 142. Accordingly, the structure of the spacer 142 can be simplified and rigidity of the spacer 142 can be secured.

In addition, in, the alternative embodiment shown in FIG. 11, the distance L3 between the bolt 156 and the rear end portion of the slit 154 along the longitudinal direction of the vehicle is desirably set to be the same (substantially the same) as the compression stroke S in the crush box 114 as described above. However, the distance L3 may be set as the compression stroke S or more as long as the movement of the spacer 142 toward the back side of the vehicle relative to the front side member 112 can be inhibited after the compressive deformation of the crush box 114.

Figure 12:
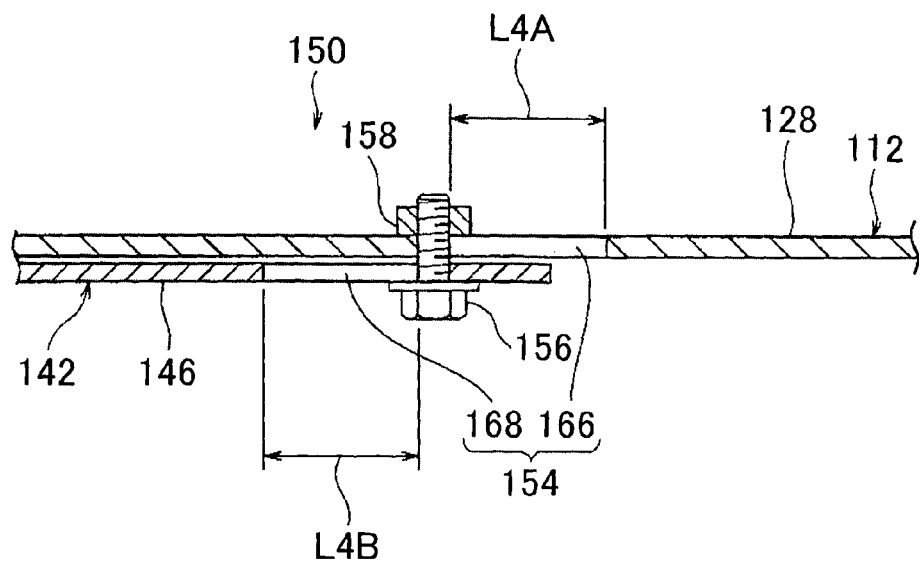
FIG. 12 is a drawing that shows the second alternative embodiment of the vehicle body front structure of the second embodiment according to the present invention.
Figure 12:
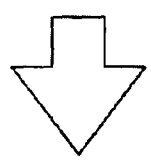
Figure 12:
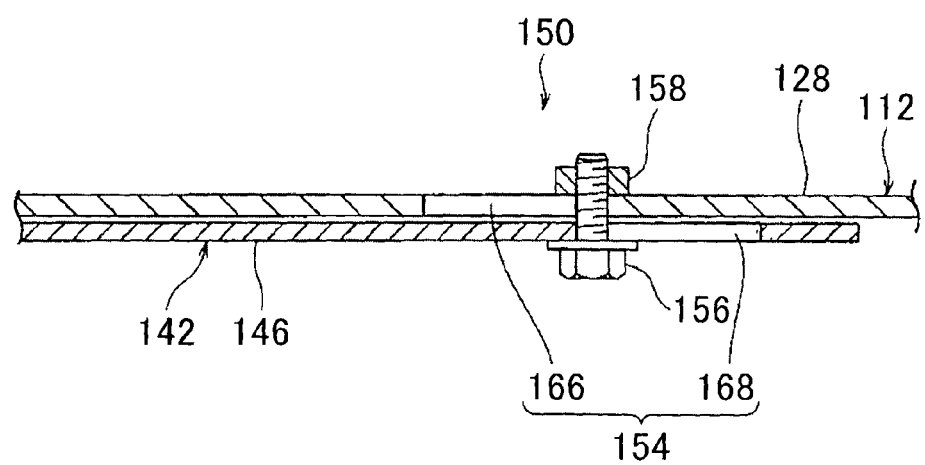

Moreover, in the second embodiment of the present invention, the load transmission adjustment portion 150 may be formed as shown in FIG. 12. That, is, in the alternative embodiment shown in FIG. 12, the slit 154 has a first slit 166 formed in the front side member outer 128 and a second slit 168 formed in the side wall portion 146 of the spacer 142. The first slit 166 and the second slit 168 respectively extend in the longitudinal direction of the vehicle. Also, as shown in the upper drawing of FIG. 12, the second slit 168 extends to the front side of the vehicle to the first slit 166. The bolt 156 is sequentially inserted into a rear end portion of the second slit 168 and a front end portion of the first slit 166 from the outer side in the width direction of the vehicle.

Moreover, the nut 158 is threaded into the distal end portion of the bolt 156 from the inner side in the width direction of the vehicle, whereby the spacer 142 is fastened to the front side member 112. As shown in the upper drawing of FIG. 12, in a normal state (the state that the crush box 114 is not subjected to the compressive deformation), the bolt 156 is engaged with the front end portion of the first slit 166 and the rear end portion of the second slit 168.

A total distance of the first distance L4A between the bolt 156 and the rear end portion of the first slit 166 along the longitudinal direction of the vehicle and a second distance L4B between the front end portion of the second slit 168 and the bolt 156 along the longitudinal direction of the vehicle is set to be the same (substantially the same) as the compression stroke S in the crush box 114 described above.

Even with this configuration, during the compressive deformation of the crush box 114, since the bolt 156 relatively moves with respect to the slit 154, the movement of the spacer 142 toward the back side of the vehicle relative to the front side member 112 is allowed. Moreover, after the compressive deformation of the crush box 114 with the progress of the collision, as shown in the lower drawing of FIG. 11, the bolt 156 is engaged with the front end portion of the slit 154, so that the movement of the spacer 142 toward the back side of the vehicle relative to the front side member 112 is inhibited. Moreover, via the rear end portion of the slit 154 and the bolt 156, the collision load is transmitted from the spacer 142 to the front side member 112.

Moreover, compared to the case where the slit is formed in one of the front side member 112 and the spacer 142, the length of the slit formed in the front side member 112 and the spacer 142 can be shortened. This ensures rigidity of the front side member 112 and the spacer 142.

In addition, in the alternative embodiment shown in FIG. 12, the total distance of the first distance L4A and the second distance L4B is desirably set to be the same (substantially the same) as the compression stroke S in the crush box 114 as described above. However, the total distance of the first distance L4A and the second distance L4B may be set as the compression stroke S or more as long as the movement of the spacer 142 toward the back side of the vehicle relative to the front side member 112 can be inhibited after the compressive deformation of the crush box 114.

As described above, while the second embodiment of the present invention has been explained, the present invention is not limited to the above and can be executed with various modification other than the above without departing from the gist of the present invention.

The first embodiment and the second embodiment may be appropriately combined. For example, in the first embodiment, a slit extending in the longitudinal direction of the vehicle is formed at least one of the front side member 12 and the spacer 42, and a bolt may be inserted in the slit. According to this configuration, when a collision load acts on the extending portion 40 from the front side in the longitudinal direction of the vehicle, the bolt moves in the slit in accordance with the compressive deformation of the crush box 14. Moreover, after the compressive deformation of the crush box, the bolt is engaged with an end portion of the slit. As a result, the vehicle body front structure 10 can transmit the collision load not only by engagement between the engaging portion 48 and the stepped portion 54 but also by engagement between the slit and the bolt.

The invention claimed is:

1. A vehicle body front structure comprising:
a front side member that extends in a longitudinal direction of a vehicle;
a crush box that is provided on a front side of the front side member in the longitudinal direction of the vehicle and has lower compression strength than compression strength of the front side member in the longitudinal direction of the vehicle;
a bumper reinforcement that extends in a width direction of the vehicle and is fixed to a front end portion of the front side member via the crush box;
a spacer that has an engaging portion and protrudes rearward in the longitudinal direction of the vehicle from an extending portion formed outside in the width direction of the vehicle relative to a connected portion of the bumper reinforcement, the connected portion being connected to the crush box; and
a stepped portion that is formed on a part of a side wall portion of the front side member, that is provided behind the engaging portion in the longitudinal direction of the vehicle to be apart from the engaging portion, and that is configured to engage with the engaging portion after the crush box is deformed in the longitudinal direction of the vehicle, wherein
a recess that is recessed inward in the width direction of the vehicle is formed on the side wall portion,
the stepped portion is formed by a wall portion of a back side of the recess in the longitudinal direction of the vehicle, and
a pair of guide portions is formed on the recess, the guide portions extending forward in the longitudinal direction of the vehicle from both end portions of the stepped portion in a vertical direction of the vehicle.

2. The vehicle body front structure according to claim 1, wherein
the recess is provided at a height equal to a height of the spacer in the vertical direction of the vehicle.

3. The vehicle body front structure according to claim 1, wherein
a distance between the engaging portion and the stepped portion along the longitudinal direction of the vehicle is a compression stroke of the crush box or more.

4. The vehicle body front structure according to claim 3, wherein
the distance between the engaging portion and the stepped portion along the longitudinal direction of the vehicle is equal to the compression stroke of the crush box.

5. A vehicle body front structure comprising:
a front side member that extends in a longitudinal direction of a vehicle;
a crush box that is provided on a front side of the front side member in the longitudinal direction of the vehicle and has lower compression strength than compression strength of the front side member in the longitudinal direction of the vehicle;
a bumper reinforcement that extends in a width direction of the vehicle and is fixed to a front end portion of the front side member via the crush box;
a spacer that has an engaging portion and protrudes rearward in the longitudinal direction of the vehicle from an extending portion formed outside in the width direction of the vehicle relative to a connected portion of the bumper reinforcement, the connected portion being connected to the crush box; and
a stepped portion that is formed on a part of a side wall portion of the front side member, that is provided behind the engaging portion in the longitudinal direction of the vehicle to be apart from the engaging portion, and that is configured to engage with the engaging portion after the crush box is deformed in the longitudinal direction of the vehicle, wherein
the stepped portion is formed on the side wall portion, and
a reinforcement patch is attached on an inner face of the side wall portion in the width direction of the vehicle to overlap with the stepped portion.

6. The vehicle body front structure according to claim 5, wherein
the front side member includes a front side member inner and a front side member outer, the front side member inner having a hat-shaped cross-section opened outward in the width direction of the vehicle, the front side member outer being placed outside relative to the front side member inner in the width direction of the vehicle,
an upper end portion of the reinforcement patch is coupled to upper end portions of the front side member inner and the front side member outer, and
a lower end portion of the reinforcement patch is coupled to lower end portions of the front side member inner and the front side member outer.

7. A vehicle body front structure, comprising:
a front side member that extends in a longitudinal direction of a vehicle;
a crush box that is provided on a front side of the front side member in the longitudinal direction of the vehicle and has lower compression strength than compression strength of the front side member in the longitudinal direction of the vehicle;
a bumper reinforcement that extends in a width direction of the vehicle and is fixed to a front end portion of the front side member via the crush box;
a spacer that protrudes rearward in the longitudinal direction of the vehicle from an extending portion formed outside in the width direction of the vehicle relative to a connected portion of the bumper reinforcement, the connected portion being connected to the crush box; and
a pin portion configured to inhibit the spacer from moving rearward relative to the front side member in the longitudinal direction of the vehicle, wherein
a slit that extends in the longitudinal direction of the vehicle is formed on at least one of the front side member and the spacer,
the pin portion is inserted into the slit,
the pin portion is configured to move in the slit in accordance with compressive deformation of the crush box when a collision load acts on the extending portion from a front side of the vehicle, and the pin portion is engaged with an end portion of the slit after the compressive deformation of the crush box.

8. The vehicle body front structure according to claim 7, wherein the pin portion is configured to move in the slit during the compressive deformation of the crush box, and after the compressive deformation of the crush box, the pin portion is engaged with the end portion of the slit to inhibit the spacer from moving rearward relative to the front side member.

9. The vehicle body front structure according to claim 7, wherein the slit is formed on one of the front side member and the spacer.

10. The vehicle body front structure according to claim 7, wherein the slit includes a first slit formed on the front side member and a second slit formed on the spacer.

11. The vehicle body front structure according to claim 7, wherein a distance between a front end portion of the slit and the pin portion along the longitudinal direction of the vehicle before the compressive deformation of the crush box is a compression stroke of the crush box or more.

12. The vehicle body front structure according to claim 11, wherein the distance between the front end portion of the slit and the pin portion along the longitudinal direction of the vehicle before the compressive deformation of the crush box is equal to the compression stroke of the crush box.

* * * * *